US011507840B2

(12) United States Patent
Ratner et al.

(10) Patent No.: US 11,507,840 B2
(45) Date of Patent: Nov. 22, 2022

(54) REGION CONSTRAINED REGULARIZED ADVERSARIAL EXAMPLES FOR MODEL INTERPRETABILITY

(71) Applicant: International Business Machines Corporation, Armonk, NY (US)

(72) Inventors: Vadim Ratner, Haifa (IL); Yoel Shoshan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 16/681,868

(22) Filed: Nov. 13, 2019

(65) Prior Publication Data

US 2021/0142176 A1 May 13, 2021

(51) Int. Cl.
*G06N 3/08* (2006.01)
*G06K 9/62* (2022.01)
*G06N 20/00* (2019.01)

(52) U.S. Cl.
CPC ........... *G06N 3/084* (2013.01); *G06K 9/6268* (2013.01); *G06N 20/00* (2019.01)

(58) Field of Classification Search
CPC ....... G06N 3/084; G06N 20/00; G06K 9/6268
See application file for complete search history.

(56) References Cited

U.S. PATENT DOCUMENTS

| 11,295,210 | B2* | 4/2022 | Baker | G06N 3/082 |
| 2016/0307096 | A1* | 10/2016 | Goel | G06N 20/00 |
| 2017/0024642 | A1* | 1/2017 | Xiong | G06N 3/08 |
| 2018/0322406 | A1 | 11/2018 | Merrill et al. | |
| 2019/0156216 | A1 | 5/2019 | Gupta et al. | |

OTHER PUBLICATIONS

Ribeiro, M.T., Singh, S. Guestrin, C, "Why Should I Trust You?" Explaining the Predictions of Any Classifier, KDD '16 Proceedings of the 22nd ACM SIGKDD International Conference on Knowledge Discovery and Data Mining Aug. 13-17, 2016, pp. 1135-1144, ACM, San Francisco, California, USA.

(Continued)

*Primary Examiner* — Jianchun Qin
(74) *Attorney, Agent, or Firm* — Gregory J Kirsch

(57) ABSTRACT

Embodiments may exclude portions of input data in order to improve the accuracy and explanatory quality of the output of machine learning models by disregarding parts of the input during the optimization process by masking them during backpropagation. For example, in an embodiment, a method may be implemented in a computer system comprising a processor, memory accessible by the processor, and computer program instructions stored in the memory and executable by the processor, the method may comprise receiving, at the computer system, input data and a machine learning model to generate a prediction based on the input data, generating, at the computer system, a mask indicating portions of the input data to be disregarded during backpropagation of the machine learning model, and modifying, at the computer system, the generated mask to improve the prediction of the machine learning model.

15 Claims, 4 Drawing Sheets

(56) References Cited

OTHER PUBLICATIONS

Fong, R.C., Vedaldi, A., Interpretable Explanations of Black Boxes by Meaningful Perturbation, 2017 IEEE International Conference on Computer Vision (ICCV), Oct. 22-29, 2017, pp. 3449-3457, IEEE, Venice, Italy.

Wagner, J., Köhler, J.M., Gindele, T., Hetzel, L., Wiedemer, J.T., Behnke, S., Interpretable and Fine-Grained Visual Explanations for Convolutional Neural Networks, In Proceedings of IEEE Conference on Computer Vision and Pattern Recognition (CVPR), Jun. 2019, IEEE, Long Beach, CA, USA.

Du, M., Liu, N., Song, Q., Hu, X., Towards Explanation of DNN-based Prediction with Guided Feature Inversion, KDD '18 Proceedings of the 24th ACM SIGKDD International Conference on Knowledge Discovery & Data Mining, Aug. 19-23, 2018, pp. 1358-1367, ACM, London, United Kingdom.

\* cited by examiner

REGION CONSTRAINED REGULARIZED ADVERSARIAL EXAMPLES FOR MODEL INTERPRETABILITY

BACKGROUND

The present invention relates to techniques to exclude portions of input data in order to improve the accuracy and explanatory quality of the output of machine learning models by disregarding parts of the input during the optimization process by masking them during backpropagation.

As machine learning algorithms continue to improve, there is an increasing need for explaining why a given model produces a certain prediction. The benefits of such an explanation fall roughly into two categories: explaining the end result for the user, and analysis of the network by the researcher. Many conventional explainability methods focus on identifying parts of the input that influence the score a machine learning process, such as a neural network, assigns to a given class. In this context, it is beneficial to be able to limit the choice of areas of input that can be presented as, or included in, the explanation. An example for such a need is a radiologist who analyzes a medical image that contains a finding, and wishes to locate incidental, for example, additional, potentially malignant findings, and wants to exclude the main finding from consideration.

One of the uses of such explainability is that of unsupervised segmentation—such as identifying an area that contains an object of a given class, despite not having access to any location information. Often, the segmented areas may only contain small parts of the object in question, such as only the parts that most strongly influence the decision.

Conventional techniques for detecting the parts of the input that are responsible for increasing the prediction of a given model are typically function by minimizing the score with respect to the input, under additional constraints. However, conventional techniques cannot remove certain regions from consideration. For example, a user may want to exclude a portion of an input from the explanation, such as a radiologist that realizes an area is suspicious and wants to analyze another area's contribution. Another example is when a small area has such strong contribution that it completely dominates the optimization process, resulting in convergence to only partial explanation (this is usually the case in practice).

Accordingly, a need arises for techniques that provide the capability to exclude portions of the input in order to improve the accuracy and explanatory quality of the output.

SUMMARY

Embodiments may provide techniques that provide the capability to exclude portions of the input in order to improve the accuracy and explanatory quality of the output. Embodiments may, for example, disregard parts of the input during the optimization process by masking them during backpropagation. Embodiments may, for example, progressively grow the explanation by masking the explanation region discovered so far.

For example, in an embodiment, a method may be implemented in a computer system comprising a processor, memory accessible by the processor, and computer program instructions stored in the memory and executable by the processor, the method may comprise receiving, at the computer system, input data and a machine learning model to generate a prediction based on the input data, generating, at the computer system, a mask indicating portions of the input data to be disregarded during backpropagation of the machine learning model, and modifying, at the computer system, the generated mask to improve the prediction of the machine learning model.

In embodiments, modifying the input data may comprise iteratively modifying, at the computer system, a perturbed or adversarial version of the input data using a gradient of a loss function with respect to the input data, while keeping the machine learning model frozen, wherein the perturbed or adversarial version of the input data is unchanged in a portion defined by the mask and generating, at the computer system, a saliency mask approximating support of the perturbation to smoothly approximates a step function. Modifying the mask may further comprise expanding, at the computer system, the mask by adding the generated saliency mask to the mask to generate a modified mask. The loss function may be based on a first term that reduces a classification value of a class of the machine learning model to a given value, a second term that approximates the size of support of the perturbation, and a third term that encourages smoothness of support of the perturbation, preferring continuous regions of non-zero values over scattered individual elements. The input data may be an image. The mask may be a portion of the pixels of the image.

In an embodiment, a system may comprise a processor, memory accessible by the processor, and computer program instructions stored in the memory and executable by the processor to perform receiving input data and a machine learning model to generate a prediction based on the input data, generating a mask indicating portions of the input data to be disregarded during backpropagation of the machine learning model, and modifying the generated mask to improve the prediction of the machine learning model.

In an embodiment, a computer program product may comprise a non-transitory computer readable storage having program instructions embodied therewith, the program instructions executable by a computer system, to cause the computer system to perform a method comprising receiving, at the computer system, input data and a machine learning model to generate a prediction based on the input data, generating, at the computer system, a mask indicating portions of the input data to be disregarded during backpropagation of the machine learning model, and modifying, at the computer system, the generated mask to improve the prediction of the machine learning model.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide techniques that provide the capability to exclude portions of the input in order to improve the accuracy and explanatory quality of the output. Embodiments may, for example, disregard parts of the input during the optimization process by masking them during backpropagation. Embodiments may, for example, progressively grow the explanation by masking the explanation region discovered so far.

Figure 1:
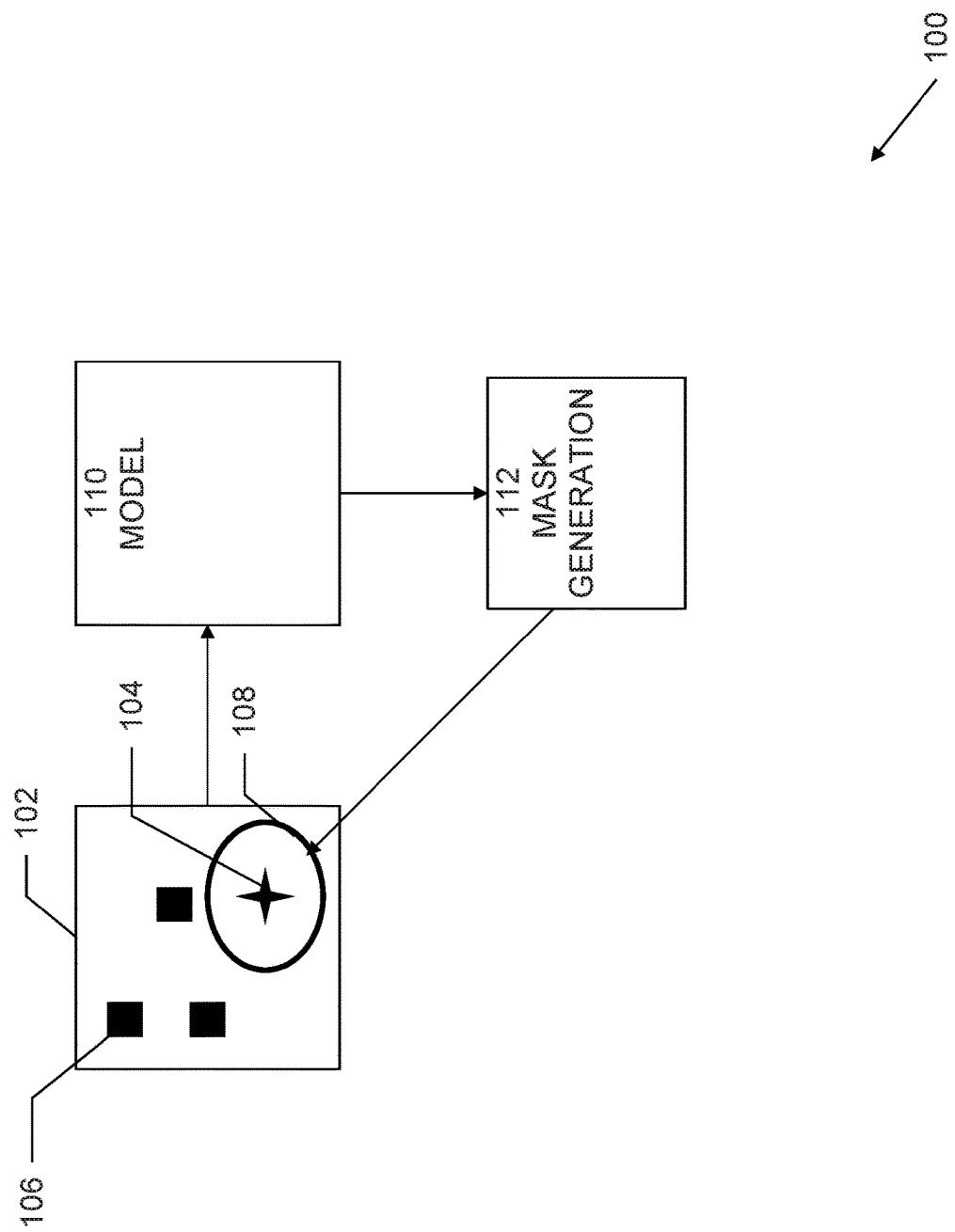
FIG. 1 illustrates an exemplary block diagram of a system in which embodiments of the present systems and methods may be implemented.

An exemplary block diagram of a system 100 is shown in FIG. 1. In this example, input data 102, such as a one or more images, may include a plurality of features 104, 106. In this example, portions of input data 102 including features 106 may be excluded in order to improve the accuracy and explanatory quality of the output. A mask 108 may be used to exclude the portions of input data 102 including features 106 and thus, to include the portions of input data 102 including features 108. Input data 102 may be input to model to generate predictions based on input data 102. Mask generation 112 may perform an optimization process by masking portions of input data 102 using mask 108 during backpropagation. Embodiments may, for example, progressively grow the explanation by masking the explanation region discovered so far.

Embodiments may provide an explanation of a model (network) decision as the part of the input that most influences that decision. For example, in the case of images—a region of the image that most influences a decision on the image. In case of vector inputs—a subset of the vector that most influences a decision on the vector. Embodiments may utilize a mechanism that excludes parts of the input from an explanation. Embodiments may be applied to use cases for such a mechanism. For example, embodiments may allow a user to exclude regions that are "obvious" to him/her. Likewise, embodiments may improve explainability-based unsupervised segmentation by progressively growing the explanation mask, by excluding previously found explanations and augmenting them by newly found ones. In addition, or alternatively, the localization of the object classified by the learning model may be improved by modifying or growing the explanation mask.

Figure 2:
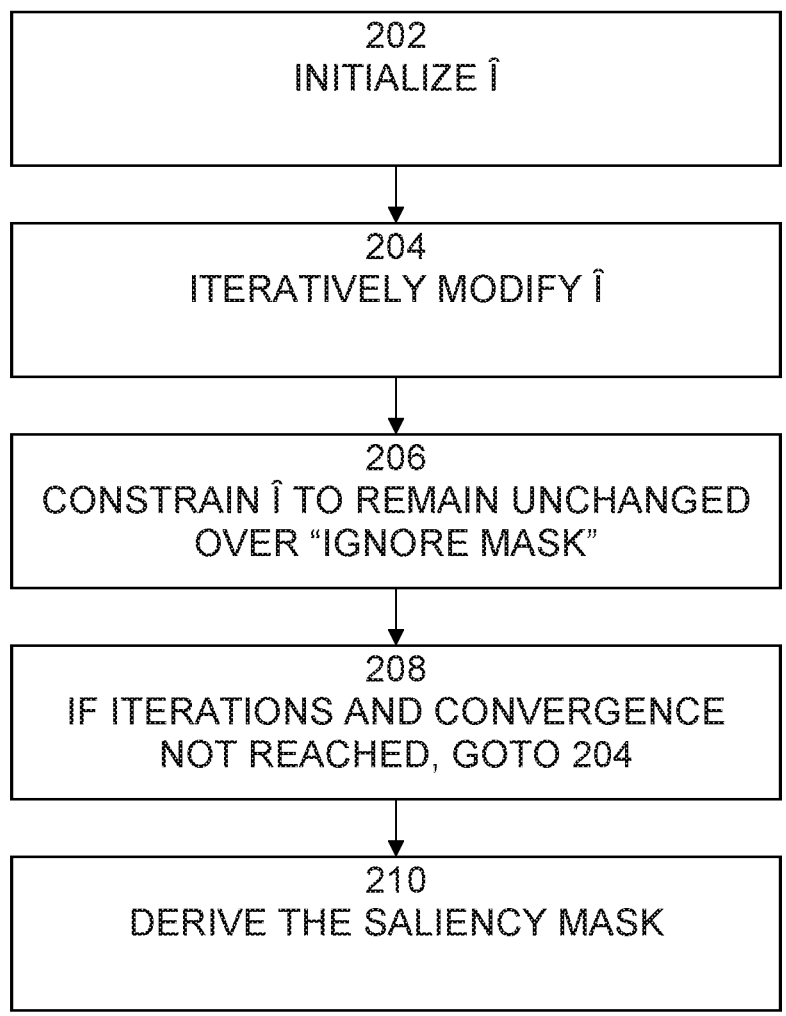
FIG. 2 is an exemplary flow diagram of an embodiment of a process of a "Masked" model explanation or interpretation according to embodiments of the present systems and methods.

An exemplary flow diagram of an embodiment of a process 200 of a "Masked" model explanation or interpretation is shown in FIG. 2. In this example, inputs to process 200 may include an existing "ignore" mask K, a model M, an input image I, and a class C. Image variable $\hat{I}$ may represent a perturbed version or adversarial version of the image. Process 200 may begin with 202, in which an image variable $\hat{I}$ may be initialized to the input image I. At 204, variable $\hat{I}$ may be iteratively modified using the gradient of the loss function E with respect to the input, while keeping the model M frozen. The loss function E may be defined to include 3 terms: 1) a first term that reduces a classification value of class I to a given value s; 2) a second term that approximates the size of support of the perturbation; and 3) a third term that encourages smoothness of support of the perturbation, preferring continuous regions of non-zero values over scattered individual elements (pixels in the case of images). Embodiments may use any gradient-based optimizer, including, for example, SGD, Adam, AdaDelta, etc.

At 206, image variable $\hat{I}$ may be constrained to remain unchanged over an "ignore mask", that is, equal to I, in an area defined by K (the "ignore" area). Image variable $\hat{I}$ may be constrained to remain in the original applicable values range which the input is sampled from, for example, by clipping its values. At 208, if fewer than a predetermined number iterations have been performed and if convergence is not reached, then process 200 may go to 204 to perform additional iterations. If, at 208, the predetermined number iterations have been performed or if convergence has been reached, then at 210, the saliency mask may be derived by thresholding S at zero. The saliency mask defines the area of the image that is to be used for explanation or interpretation of the model. S may be defined as an approximation of the support of the perturbation in a way that smoothly approximates a step function. S may drop below zero for small values, which may encourage sparsity. The perturbation may be defined to be the delta between the original input I and the perturbed version or adversarial version in image variable $\hat{I}$.

Figure 3:
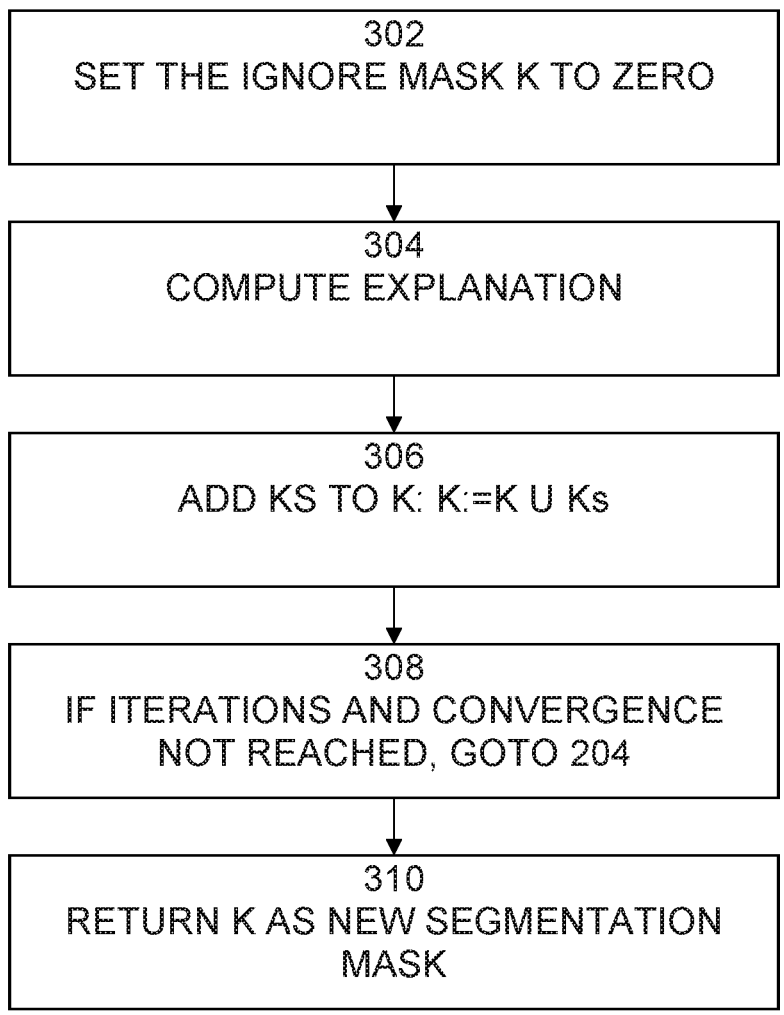
FIG. 3 is an exemplary flow diagram of an embodiment of a process of unsupervised segmentation by explanation or interpretation according to embodiments of the present systems and methods.

An exemplary flow diagram of an embodiment of a process 300 of unsupervised segmentation by explanation or interpretation is shown in FIG. 3. In this example, inputs to process 300 may include a model M, an input image I, and a class C. Process 300 may begin with 302, in which an ignore mask K may be set to zero. At 304, an explanation or interpretation may be computed using process 200 to generate a Masked Explanation, with inputs K=0, M, I and C, to yielding saliency mask Ks. At 306, Ks may be added to K according to K:=K∪Ks. At 308, if fewer than a predetermined number iterations have been performed and if convergence is not reached, then process 300 may go to 304 to perform additional iterations of 304 and 306. If, at 308, the predetermined number iterations have been performed or if convergence has been reached, then at 310, K may be returned as the new segmentation mask.

Figure 4:
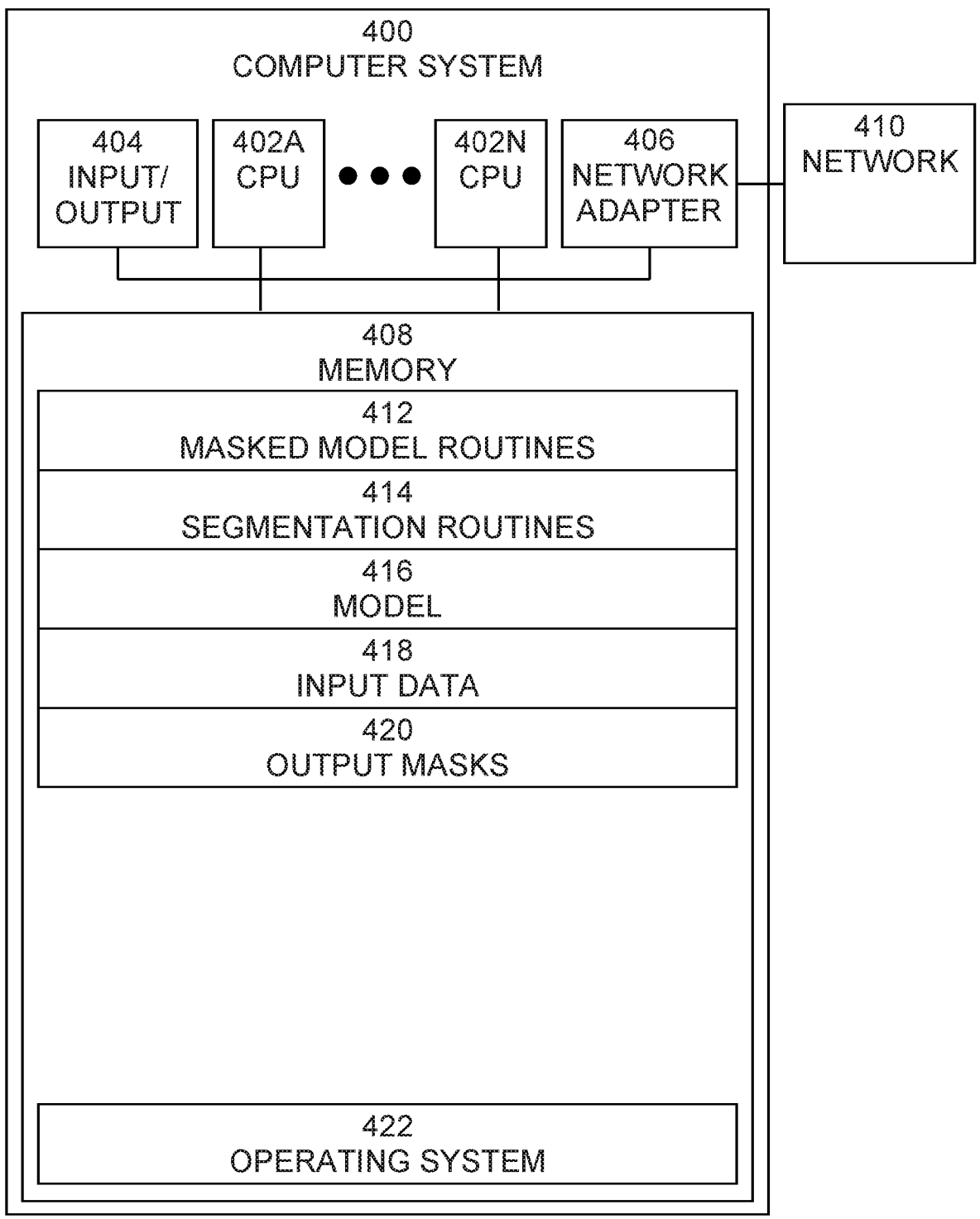
FIG. 4 is an exemplary block diagram of a computer system, in which processes involved in the embodiments described herein may be implemented.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 4, memory 408 may include masked model routines 412, segmentation routines 414, models 416, input data 418, output masks 420, and operating system 422. Message collection routines 412 may include software routines to generate masked model saliency masks, which may be included in output masks 420, as described above. Segmentation routines 414 may include software routines to generate unsupervised segmentation masks, which may be included in output masks 420, as described above. Models 416 may include software routines and data to perform machine learning modeling, such as neural networks, etc., as described above. Input data 418 may include data, such as image or other data, to be processed by models 416 using output masks 420, as described above. Operating system 422 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising:
   receiving, at the computer system, input data and a machine learning model to generate a prediction based on the input data;
   generating, at the computer system, a mask indicating portions of the input data to be disregarded during backpropagation of the machine learning model;
   modifying, at the computer system, the generated mask to, at least one of:
      improve the explanation of the machine learning model, or,
      improve the localization of the object classified by the learning model;
   wherein, modifying the mask further comprises iteratively modifying, at the computer system, a perturbed or adversarial version of the input data using a gradient of a loss function with respect to the input data, while keeping the machine learning model frozen, wherein the perturbed or adversarial version of the input data is unchanged in a portion defined by the mask; and
   generating, at the computer system, a saliency mask approximating support of the perturbation to smoothly approximate a step function.

2. The method of claim 1, wherein modifying the mask further comprises:
   expanding, at the computer system, the mask by adding the generated saliency mask to the mask to generate a modified mask.

3. The method of claim 2, wherein the loss function loss is based on a first term that reduces a classification value of a class of the machine learning model to a given value, a second term that approximates the size of support of the perturbation, and a third term that encourages smoothness of support of the perturbation, preferring continuous regions of non-zero values over scattered individual elements.

4. The method of claim 3, wherein the input data is an image.

5. The method of claim 4, wherein the mask is a portion of the pixels of the image.

6. A system comprising a processor, memory accessible by the processor, and computer program instructions stored in the memory and executable by the processor to perform:
   receiving input data and a machine learning model to generate a prediction based on the input data;
   generating a mask indicating portions of the input data to be disregarded during backpropagation of the machine learning model;
   modifying the generated mask to, at least one of:
      improve the explanation of the machine learning model, or,
      improve the localization of the object classified by the learning model;

wherein, modifying the mask further comprises iteratively modifying a perturbed or adversarial version of the input data using a gradient of a loss function with respect to the input data, while keeping the machine learning model frozen, wherein the perturbed or adversarial version of the input data is unchanged in a portion defined by the mask; and generating a saliency mask approximating support of the perturbation to smoothly approximate a step function.

7. The system of claim 6, wherein modifying the mask further comprises:

expanding the mask by adding the generated saliency mask to the mask to generate a modified mask.

8. The system of claim 7, wherein the loss function loss is based on a first term that reduces a classification value of a class of the machine learning model to a given value, a second term that approximates the size of support of the perturbation, and a third term that encourages smoothness of support of the perturbation, preferring continuous regions of non-zero values over scattered individual elements.

9. The system of claim 8, wherein the input data is an image.

10. The system of claim 9, wherein the mask is a portion of the pixels of the image.

11. A computer program product comprising a non-transitory computer readable storage having program instructions embodied therewith, the program instructions executable by a computer system, to cause the computer system to perform a method comprising:

receiving, at the computer system, input data and a machine learning model to generate a prediction based on the input data;

generating, at the computer system, a mask indicating portions of the input data to be disregarded during backpropagation of the machine learning model;

modifying, at the computer system, the generated mask to, at least one of:

improve the explanation of the machine learning model, or, improve the localization of the object classified by the learning model;

wherein, modifying the mask further comprises iteratively modifying, at the computer system, a perturbed or adversarial version of the input data using a gradient of a loss function with respect to the input data, while keeping the machine learning model frozen, wherein the perturbed or adversarial version of the input data is unchanged in a portion defined by the mask; and generating, at the computer system, a saliency mask approximating support of the perturbation to smoothly approximate a step function.

12. The computer program product of claim 11, wherein modifying the mask further comprises:

expanding, at the computer system, the mask by adding the generated saliency mask to the mask to generate a modified mask.

13. The computer program product of claim 12, wherein the loss function loss is based on a first term that reduces a classification value of a class of the machine learning model to a given value, a second term that approximates the size of support of the perturbation, and a third term that encourages smoothness of support of the perturbation, preferring continuous regions of non-zero values over scattered individual elements.

14. The computer program product of claim 13, wherein the input data is an image.

15. The computer program product of claim 14, wherein the mask is a portion of the pixels of the image.

* * * * *